United States Patent [19]

Bosso et al.

[11] 4,038,232

[45] July 26, 1977

[54] ELECTRODEPOSITABLE COMPOSITIONS CONTAINING SULFONIUM RESINS AND CAPPED POLYISOCYANATES

[75] Inventors: Joseph F. Bosso, Lower Burrell; Marco Wismer, Gibsonia, both of Pa.

[73] Assignee: PPG Industries, Inc., Pittsburgh, Pa.

[21] Appl. No.: 594,152

[22] Filed: July 8, 1975

Related U.S. Application Data

[63] Continuation of Ser. No. 316,596, Dec. 19, 1972, abandoned.

[51] Int. Cl.$^2$ .......................... C08F 8/30; C08F 8/34; C08J 3/06; C08L 13/00
[52] U.S. Cl. ........................ 260/29.6 TA; 204/181; 260/29.2 TN; 260/29.2 EP; 260/29.6 N; 260/47 EC; 260/830 P; 526/16; 526/30; 526/49
[58] Field of Search ................ 260/29.6 TA, 29.2 EP

[56] References Cited

U.S. PATENT DOCUMENTS

| | | | |
|---|---|---|---|
| 2,676,166 | 4/1954 | Webers | 260/29.6 TA |
| 2,831,781 | 4/1958 | Upson et al. | 260/29.6 TA |
| 3,501,432 | 3/1970 | Wright et al. | 260/29.6 TA |
| 3,772,228 | 11/1973 | Allen | 260/29.2 EP |
| 3,793,278 | 2/1974 | DeBona | 260/29.2 EP |

*Primary Examiner*—John C. Bleutge
*Assistant Examiner*—A. H. Koeckert
*Attorney, Agent, or Firm*—William J. Uhl

[57] ABSTRACT

It has been found that aqueous coating compositions comprising a blocked organic polyisocyanate and quaternary sulfonium group-containing resin containing isocyanate reactive groups can be electrodeposited. These compositions deposit on the cathode to provide coatings having excellent properties including solvent resistance, salt spray and detergent resistance, hardness, flexibility, and most importantly a resistance to yellowing, especially when used to formulate white or pastel coatings.

14 Claims, No Drawings

4,038,232

ELECTRODEPOSITABLE COMPOSITIONS CONTAINING SULFONIUM RESINS AND CAPPED POLYISOCYANATES

This is a continuation of application Ser. No. 316,596, filed Dec. 19, 1972, now abandoned.

BACKGROUND OF THE INVENTION

Electrodeposition as a coating application method involves the deposition of a film-forming material under the influence of an applied electrical potential and has become of increasing commercial importance. Along with the increased use of such methods has been the development of various compositions which provide more or less satisfactory coatings when applied in this manner. However, most conventional coating techniques do not produce commercially usable coatings, and electrodeposition of many coating materials, even when otherwise successful, is often attended by various disadvantages such as non-uniform coatings and by poor throw power, i.e., the ability to coat areas of the electrode which are remote or shielded from the other electrode. In addition, the coatings obtained are in many instances deficient in certain properties essential for the utilization in certain applications for which electrodeposition is otherwise suited. In particular, properties such as corrosion resistance and alkali resistance are difficult to achieve with the resins conventionally employed in electrodeposition processes, and many electrodeposited coatings are subject to discoloration or staining because of chemical changes associated with electrolytic phenomena at the electrodes and with the types of resinous materials ordinarily utilized. This is especially true with the conventional resin vehicles used in electrodeposition processes which contain polycarboxylic acid resins neutralized with a base; these deposit on the anode and because of their acidic nature tend to be sensitive to common types of corrosive attack, e.g., by salt, alkali, etc. Further anodic deposition tends to place the uncured coating in proximity to metal ions evolved at the anode, thereby causing staining with many coating systems.

The preparation of white or pastel films with high gloss, gloss retention, and resistance to yellowing is a particular problem in electrodepositable films.

DESCRIPTION OF THE INVENTION

It has now been found that aqueous compositions comprising a capped or blocked organic polyisocyanate and a quaternary sulfonium group-containing resin may be electrodeposited on a cathode to produce coatings with highly desirable properties, including alkali resistance, resistance to staining, and resistance to yellowing.

The capped or blocked isocyanate which may be employed in the compositions of the invention may be any isocyanate where the isocyanato groups have been reacted with a compound so that the resultant capped isocyanate is stable to hydroxyl groups at room temperature but reactive with hydroxy and/or epoxy groups at elevated temperatures, usually between about 200° F. and about 600° F.

In the preparation of the blocked organic polyisocyanate, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine, and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene, and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear substituted aromatic compounds such as dianisidine diisocyanate, 4,4'-diphenylether diisocyanate, and chloro-diphenylene diisocyanate; the triisocyanates such as triphenyl methane-4,4',4''-triisocyanate, 1,3,5-triisocyanate benzene, and 2,4,6-triisocyanate toluene; and the tetra-isocyanates such as 4,4'-diphenyl-dimethyl methane-2,2'-5,5'-tetraisocyanate; the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate terminated prepolymers may be simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide, and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol, and mixtures thereof. Other types of polyoxyalklene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose, and the like with alkylene oxides such as ethylene oxide, propylene oxide, their mixtures, and the like.

Any suitable aliphatic aliphatic, cycloaliphatic, or aromatic alkyl monoalcohol may be used as a blocking agent in accordance with the present invention, such as, for example, aliphatic alcohols, such as methyl, ethyl, chloroethyl, propyl, butyl, amyl, hexyl, heptyl, octyl, nonyl, 3,3,5-trimethylhexanol, decyl, and lauryl alcohols, and the like; the cycloaliphatic alcohols such as, for example, cyclopentanol, cyclohexanol, and the like, the aromatic-alkyl alcohols, such as, phenylcarbinol, methylphenylcarbinol, and the like. Minor amounts of even higher molecular weight relatively non-volatile monoalcohols may be used, if desired, to serve as plasticizers in the coatings provided by this invention.

Additional blocking agents include hydroxyl amines such as ethanolamine and oximes such as methylethyl ketone oxime, acetone oxime, and cyclohexanone oxime.

The organic polyisocyanate-blocking agent adduct is formed by reacting a sufficient quality of alcohol with the organic polyisocyanate to insure that no free isocyanate groups are present. The reaction between the organic polyisocyanate and the blocking agent is exothermic; therefore, the polyisocyanate and the blocking agent are preferably admixed at temperatures no higher than 80° C. and, preferably, below 50° C. to minimize the exotherm effect.

As previously stated, the composition employed in the method of this invention is a coating composition comprising an aqueous dispersion prepared from a fully capped or blocked organic polyisocyanate with a resin solubilized through a quaternary sulfonium salt group.

Electrodepositable compositions, while referred to as "solubilized", in fact are considered a complex solution, dispersion or suspension, or combination of one or more of these classes in water which acts as an electrolyte under the influence of an electric current. While, no doubt in some circumstances the vehicle resin is in solution, it is clear that in some instances, and perhaps in most, the vehicle resin is a dispersion which may be called a molecular dispersion of molecular size between a colloidal suspension and true solution.

The sulfonium group-containing resins employed in the compositions of this invention are ungelled, water-dispersable, epoxy resins having in their molecule at least one 1,2-epoxy group per average molecule and containing chemically-bound quaternary sulfonium base salts, the quaternary sulfonium base salts preferably being salts of boric acid and/or an acid having a dissociation constant greater than boric acid, including organic and inorganic acids. Upon solubilization, at least a portion of the salt is preferably a salt of an acid having a dissociation constant greater than about $1 \times 10^{-5}$ and especially where the resin is oxyalkylene group free. Preferably, the acid is an organic, carboxylic acid. The presently preferred acid is lactic acid. Preferably the resin contains from about 0.1 to about 35 percent by weight sulfur and at least about 1 percent of said sulfur and preferably about 20 percent, more preferably about 50 percent, and most preferably, substantially all of the sulfur being in the form of chemically-bound quaternary sulfonium base salt groups.

The resins within the purview of this invention thus include (a) epoxy group-containing resins containing, in addition, quaternary sulfonium group which resins may or may not contain chemically-bound boron or which may be dispersed for electrocoating with or without the addition of a boron compound and especially boric acid or a precursor thereof; or (b) epoxy group-containing resins containing, in addition, quaternary sulfonium base salts of an acid having a dissociation constant greater than $1 \times 10^{-5}$, which resin may or may not contain chemically-bound boron or which resin may be dispersed for electrocoating with or without the addition of a boron compound, and especially boric acid or a precursor thereof.

The epoxy compound can be any monomeric or polymeric compound or mixture of compounds having a 1,2-epoxy equivalency greater than 1.0, that is, in which the average number of 1,2-epoxy groups per molecule is greater than 1. It is preferred that the epoxy compound be resinous, that is, a polyepoxide, i.e., containing more than one epoxy group per molecule and, preferably, containing free hydroxyl groups. The polyepoxide can be any of the well-known epoxides. Examples of these polyepoxides have, for example, been described in U.S. Pat. Nos. 2,467,171; 2,615,007; 2,716,123; 3,030,336; 3,053,855; and 3,075,999. A useful class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be bis(4-hydroxyphenyl)-2,2-propane, 3,4'-dihydroxybenzophenone, bis(4-hydroxyphenol)-1,1-ethane, bis(4-hydroxyphenyl) 1,1-isobutane; bis(4-hydroxytertiary-butylphenyl)2,2-propane, bis(2-hydroxynaphthyl)methane, 1,5-dihydroxynaphthaline, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)2,2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid, and the like. Examples are diglycidyl adipate and diglycidyl phthalate.

Also useful are polyepoxides derived from the epoxidation of an olefinically unsaturated alicyclic compound. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are the epoxyalicyclic ethers and esters, which are well known in the art.

Another class of polyepoxides are those containing oxyalkylene groups in the epoxy molecule. Such oxyalkylene groups are typically groups of the general formula:

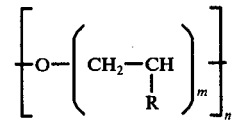

where R is hydrogen or alkyl, preferably lower alkyl (e.g., having 1 to 6 carbon atoms), and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy, and the degree of water solubility desired. Usually the epoxy contains at least about 1 per cent by weight or more, and preferably 5 per cent or more, of oxyalkylene groups.

Some polyepoxides containing oxyalkylene groups are produced by reacting some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with an alkylene oxide. Ethylene oxide, 1,2-propylene oxide, and 1,2-butylene oxide are especially useful alkyleneoxides. Other monohydric alcohols can be, for example, the commercially-available materials known as Cellosolves and Carbitols, which are monoalkyl ethers of polyalkylene glycols. The reaction of the monohydric alcohol and the polyepoxide is generally carried out in the presence of a catalyst. Formic acid, dimethylethanolamine, diethylethanolamine, N,N-dimethylbenzylamine, and, in some cases, stannous chloride, are useful for this purpose.

Similar polyepoxides containing oxyalkylene groups can be produced by oxyalkylating the epoxy resin by other means, such as by direct reaction with an alkylene oxide.

The polyepoxide employed to produce the foregoing epoxies containing oxyalkylene groups should contain a sufficient number of epoxy groups so that the average number of residual epoxy groups per molecule remaining in the product after the oxyalkylation is greater than 1.0. Where oxyalkylene groups are present, the epoxy resin preferably contains from about 1.0 to about 90 per cent or more by weight of oxyalkylene groups.

These epoxies which tend to contain unreacted alcohols or hydroxy-containing by-products are presently less preferred unless purified to remove interfering hydroxyl-containing materials.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711; epoxylated aminomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

The presently preferred class of resins which may be employed are acrylic polymers containing epoxy groups and hydroxyl groups. Preferably these acrylic polymers are polymers formed by copolymerizing an unsaturated epoxy-containing monomer, such as, for example, glycidyl acrylate or methacrylate, a hydroxyl containing unsaturated monomer, and at least one other unsaturated monomer.

Any polymerizable monomeric compound containing at least one $CH_2=C<$ group, preferably in terminal position, may be polymerized with the unsaturated glycidyl compounds. Examples of such monomers include:

1. Monoolefinic and diolefinic hydrocarbons, that is, monomers containing only atoms of hydrogen and carbon, such as styrene, alpha-methyl styrene, alpha-ethyl styrene, isobutylene (2-methyl propene-1), 2-methyl-butene-1, 2-methyl-pentene-1, 2,3-dimethyl-butene-1, 2,3-dimethyl-pentene-1, 2,4-dimethyl-pentene-1, 2,3,3-trimethylbutene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2-methyl-octene-1, 2,6-dimethyl-heptene-1, 2,6-dimethyl-octene-1, 2,3-dimethyl-decene-1, 2-methyl-nonadecene-1, ethylene, propylene, butylene, amylene, hexylene, butadiene-1,3, isopropene, and the like;

2. Halogenated monoolefinic and diolefinic hydrocarbons, that is, monomers containing carbon, hydrogen, and one or more halogen atoms, such as alpha-chlorostyrene, alpha-bromostyrene, 2,5-dichlorostyrene, 2,5-dibromostyrene, 3,4-dichlorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-flurobutene, 2-iodoprene, 2-iodopentene, 4-bromoheptene, 4-chloroheptene, 4-fluoroheptene, cis- and trans-1,2-dichloroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1-chloro-2,2,2-trifluoroethylene, chlorobutadiene, and other halogenated diolefinic compounds;

3. Esters of organic and inorganic acids, such as vinyl acetate, vinyl propionate, vinyl butyrate, vinyl isobutyrate, vinyl valarate, vinyl caproate, vinyl enanthate, vinyl benzoate, vinyl toluate, vinyl p-chlorobenzoate, vinyl-o-chlorobenzoate, and similar vinyl halobenzoates, vinyl-p-methoxybenzoate, vinyl-o-methoxybenzoate, vinyl-p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate, and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate, and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl-3,5,5-trimethyl hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethylpropyl)-1-butene-4-ol, and 1-pentene-4-ol;

Methyl alpha-chloroacrylate, methyl alpha-bromoacrylate, methyl alpha-fluoroacrylate, methyl alpha-iodoacrylate ethyl alpha, chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyanoacrylate, ethyl alpha-cyanoacrylate, amyl alpha-cyanoacrylate, and decyl alpha-cyanoacrylate.

Dimethyl maleate, diethyl maleate, diallyl maleate, dimethyl fumarate, diethyl fumarate, dimethallyl fumarate, and diethyl glutaconate;

Organic nitriles such as acrylonitrile, methacrylonitrile, ethacrylonitrile, 3-octenenitrile, crotonitrile, oleonitrile, and the like.

In carrying out the polymerization reaction, techniques well known in the art may be employed. A peroxygen type catalyst is ordinarily utilized. Diazo compounds or redox catalyst systems can also be employed as catalysts.

The preferred hydroxy-containing unsaturated monomers are hydroxyalkyl acrylates, for example, hydroxyethyl acrylate or methacrylate, hydroxypropyl acrylate or methacrylate.

Another method of producing acrylic polymers which may be utilized in this invention is to react an acrylic polymer containing reactive sites, including hydroxy groups, with an epoxy-containing compound such as the diglycidyl ether of Bisphenol A or other polyepoxides as enumerated elsewhere herein, to provide an epoxy group-containing hydroxyl group containing acrylic polymer.

The resins of the invention are formed by reacting the epoxy compound with a sulfide in the presence of an acid to form quaternary sulfonium base group-containing resins.

The sulfide employed may be virtually any sulfide which reacts with epoxy groups and which does not contain interfering groups. For example, the sulfide may be aliphatic, mixed aliphatic-aromatic, aralkyl, or cyclic. Examples of such sulfides include diethyl sulfide, dipropyl sulfide, dibutyl sulfide, diphenyl sulfide, dihexyl sulfide, ethyl phenyl sulfide, tetramethylene sulfide, pentamethylene sulfide, thiodiethanol, thiodipropanol, thiodibutanol, and the like.

The acid employed may be virtually any acid which forms a quaternary sulfonium salt. Preferably the acid is an organic carboxylic acid. Examples of acids which may be employed are boric acid, formic acid, lactic acid, acetic acid, propionic acid, butyric acid, hydrochloric acid, phosphoric acid, and sulfuric acid. Preferably, the acid is an acid having a dissociation constant greater than about $1 \times 10^{-5}$.

The ratio of sulfide to acid is not unduly critical. Since one mole of acid is utilized to form one mole of sulfonium group, it is preferred that at least one mole of acid be present for each mole of desired sulfide to sulfonium conversion.

The sulfide/acid mixture and the epoxy compound are reacted by mixing the components, usually at moderately elevated temperatures such as 70°–110° C. A solvent is not necessary, although one is often used in order to afford better control of the reaction. Aromatic hydrocarbons, monoalkyl ethers of ethylene glycol, aliphatic alcohols are suitable solvents. The proportions of the sulfide and the epoxy compound can be varied, and the optimum proportions depend upon the particular reactants. Sufficient sulfide should be utilized to provide sufficient quaternary sulfonium groups to solubilize the resin. Ordinarily, however, from about 1 part to about 50 parts by weight of the sulfide per 100 parts of epoxy compound is employed. The proportions are usually chosen with reference to the amount of sulfur, which is typically from about 0.1 to about 35 per cent, based on the total weight of the sulfide and the epoxy compound. Since the sulfide salt reacts with the epoxide groups of the epoxy resin employed, in order to provide an epoxy group-containing resin, less of the sulfide than the stoichiometric equivalent of the epoxide groups present is utilized so that the final resin is provided with one epoxy group per average molecule. When epoxy-free resins are desired, the stoichiometry is adjusted to react all the epoxy groups, or the remaining epoxy groups are hydrolyzed or otherwise reacted.

Where it is desired to incorporate boron into the resin molecule, one method is to incorporate boron by means of an amine borate or nitrogen-containing boron ester as described in copending Application Ser. No. 100,825, filed Dec. 22, 1970, the disclosure of which is hereby incorporated by reference. The boron compound reacts with available epoxy groups to provide quarternary ammonium borate groups in the resin molecule.

The reaction of the born compound may be conducted simultaneously with sulfonium group formation since the reaction conditions for this reaction are similar.

The particular reactants, proportions, and reaction conditions should be chosen in accordance with considerations well known in the art so as to avoid gellation of the product during the reaction. For example, excessively severe reaction conditions should not be employed. Similarly, compounds having reactive substituents should not be utilized along with the epoxy compounds with which those substituents might react adversely at the desired conditions.

The product forming the resin of the invention may be crosslinked to some extent; however, it remains soluble in certain organic solvents can be further cured to a hard, thermoset state. It is significantly characterized by its epoxy content and chemically-bound quaternary sulfonium content.

Aqueous compositions containing the above reaction products are highly useful as coating compositions and can be applied by any conventional method, such as by dipping, brushing, etc. They are, however, eminently suited to application by electrodeposition.

The resins of the invention are water-dispersible per se; however, additional acid solubilizing agents may be added if desired.

When epoxy groups are present in the final resin, the presence of a boron compound in the electrodeposited film is of substantial benefit in that boron compounds apparently catalyze the cure of the deposited film, allowing lower cure temperatures and/or harder films. Where the resin is first prepared without the presence of boron and/or additional boron is desired when the resin is dispersed, a compound of boron may be added, preferably boric acid or a precursor thereof.

The acid or acidic solubilizing agent is preferably any acid having a dissociation constant greater than $1 \times 10^{-5}$. Preferably, the acid or acidic solubilizing agent should be an organic acid having a dissociation constant greater than about $1 \times 10^{-5}$, the presently preferred acid being lactic acid. The addition of acid aids in stabilizing the resin since the epoxy may tend to further polymerize on storage under highly alkaline conditions. In some cases the acid also helps to obtain more complete dissolution of the resin. It is also desirable to electrodeposit these coatings from an acidic or only slightly basic solution (e.g., having a pH between about 3 and about 8.5), and the addition of acid thus is often useful to achieve the desired pH.

The resin of the invention, when placed in a water-containing medium such as an electrodeposition, high solids feed concentrate or the electrodeposition bath, changes character. Since frequently the boron, if present and chemically bonded, is apparently weakly chemically-bound in the resin, it is subject to cleavage from the resin molecule and, while the boron electrodeposits with the resin and is found in the electrodeposited film, the boron may be removed from the water-containing medium in whole or in part by separation means such as electrodialysis or ultrafiltration in the form of boric acid.

Thus, the resin in aqueous medium can be characterized as a solubilized resin having chemically-bound quaternary sulfonium base salts and containing active crosslinking sites such as active hydrogens, preferably hydroxyl and/or epoxy groups.

The resin contains from about 0.1 to about 35 per cent by weight sulfur, at least about 1 percent of said sulfur and preferably about 20 per cent more preferably 50 per cent, and most preferably substantially all, of the sulfur being in the form of chemically-bound quaternary sulfonium base salt groups.

These sulfonium group-containing resins are disclosed in copending applications Ser. No. 217,278, now abandoned filed Jan. 12, 1972, and Ser. No. 292,360, filed Sept. 26, 1972 and now abandoned. These electrodepositable resins, while referred to as "solubilized", in fact are considered a complex solution, dispersion, or suspension, or combination of one or more of these classes in water, which acts as an electrolyte under the influence of an electric current, while, no doubt, in some instances, or perhaps in most, the resin is a dispersion which may be called a molecular dispersion of molecular size between a colloidal suspension and a true solution.

The polyisocyanate-blocking agent adduct is preferably admixed with the compound containing sulfonium base salt groups in ratios of from about 0.5 to about 2.0 urethane groups for each reactive/crosslinking site, preferably hydroxyl groups.

The capped isocyanate-quaternary sulfonic resin mixture is electrodeposited on a suitable substrate and cured at elevated temperatures such as from about about 250° F. to about 600° F. At these higher temperatures the reactivity of the hydroxyl group, epoxy group, or other crosslinking site is such to enable it to break the urethane link of the adduct and react with the freed NCO groups to form a substituted urea. The alcohol released may either volatilize or remain in the mixture as a plasticizer, depending essentially on its boiling point.

Aqueous compositions containing the above components are highly useful as coating compositions particularly suited to application by electrodeposition. It is not alwarys necessary to add a neutralizing agent to the product in order to obtain a suitable aqueous composition, although an acid or acidic neutralizing agent is more preferably added. It is desirable to electrodeposit these coatings from a solution having a pH between 3 and about 9. The addition of acid thus is often useful to achieve the desired pH.

The concentration of the product in water depends upon the process parameters to be used and is in general not critical, but ordinarily the major proportion of the aqueous composition is water, e.g., the composition may contain 1 to 25 per cent by weight of the resin. In most instances a pigment composition and, if desired, various additives such as anti-oxidants, surface-active agents, and the like are included. The pigment composition may be of any conventional type comprising, for example, one or more pigments such as iron oxides, lead oxides, strontium chromate, carbon black, titanium dioxide, talc, barium sulfate, cadmium yellow, cadmium red, chromic yellow, and the like.

In electrodeposition processes employing the aqueous coating compositions described above, the aqueous composition is placed in contact with an electrically conductive anode and an electrically conductive cathode, with the surface to be coated being the cathode. Upon passage of electric current between the anode and the cathode, while in contact with the bath containing the coating composition, an adherent film of the coating composition is deposited on the cathode. This is in contrast to processes utilizing polycarboxylic acid resins which deposit on the anode, and many of the advantages described above are in large part attributed to this cathodic deposition.

The conditions under which the electrodeposition is carried out are in general similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot and tends to decrease during electrodeposition.

The method of the invention is applicable to the coating of any electrically conductive substrate, and especially metals such as steel, aluminum, copper, or the like.

After deposition, the coating is cured at elevated temperatures by any convenient method such as in baking ovens or with banks of infrared heat lamps. Curing temperatures are preferably from about 350° F. to about 425° F., although curing temperatures from about 250° F. to about 500° F., or even 600° F., may be employed if desired.

Illustrating the invention are the following examples which, however, are not construed as limiting the invention to their details. All parts and percentages in the examples, as well as throughout this specification, are by weight unless otherwise specified.

EXAMPLE I

The following sample illustrates the preparation of a quaternary sulfonium salt-solubilized acrylic resin in an electrodepositable composition containing a blocked organic polyisocyanate resin in combination therewith. The acrylic resin was prepared as follows: The monomer feed compostion was as follows:

| Monomer | Parts by Weight |
|---|---|
| Methyl methacrylate | 1300 |
| Ethyl acrylate | 1060 |
| Hydroxyethyl acrylate | 600 |
| Styrene | 600 |
| Glycidyl methacrylate | 440 |

The above monomer mixture also contained 60 parts of Vazo [azo-bis(isobutyronitrile)] and 120 parts of tertiary dodecyl mercaptan.

The polymer was prepared in the reaction flask equipped with a thermometer, stirrer, reflux condenser, monomer addition means and a continuous nitrogen gas blanket.

Into the reactor were charged 1,000 parts of n-butyl Cellosolve. The contents of the reactor were heated to 90° C. with agitation under a nitrogen blanket. Onequarter of the total of the monomers containing initiator and mercaptan were added over a period of 25 minutes. During this time an exotherm was noted and the temperature increased to 120° C. After an additional 25 minutes, the temperature dropped to 114° C. and there was added, over a 4½ hour period, the remaining monomer composition. At the end of the addition, the temperature had risen to 143° C. and the reaction mixture was held between 130°–140° C. for an additional 4 hours. The reaction mixture was then cooled and there was added 4 parts of 2,6-ditertiarybutyl paracresol.

The above reaction mixture was then cooled to 93° C. and there was then added a mixture comprising 378 parts of thiodiethanol, 328 parts of 85 percent lactic acid solution in water and 300 parts of deionized water. This addition was made over a 2-minute period. The temperature of the reaction mixture dropped to 80° C. The reaction mixture was heated to between 97° C. and 101° C. for 45 minutes and there was then added 200 parts of deionized water.

The analysis of the final resin showed 71.3 percent solids, a hydroxyl value of 176 and an epoxy value of infinity. The product had a viscosity of 54,000 centipoises. This product is identified as Polymer A.

A pigment paste was formed by admixing 210 parts of Polymer A with 600 parts of titanium dioxide, 6 parts of a cationic surfactant (Aerosol C-61) and 75 parts of butyl Cellosolve. This mixture was ground in a laboratory sand mill for 25 minutes. There was then added an additional 55 parts of butyl Cellosolve.

An electrodepositable composition was then formulated as follows: There were admixed 35.3 parts of the above pigment paste, 51.6 parts of Polymer A and 9.4 parts (7.5 parts of solids) of a 2-ethylhexanol capped trifunctional aliphatic isocyanate (Desmodur N-100), the solvent present being methyl-n-butyl ketone, 1.0 part dibutyl tin dilaurate and 625 parts of deionized water. This provided an approximately 10 percent solids electrodepositable composition.

The above composition was electrodeposited on zinc phosphate steel panels at 300 volts for 120 seconds at a bath temperature of 77° F. The resultant electrodeposited film was baked at 350° F. for 25 minutes. The film build was 1.25 mils, the film has a 2H+ pencil hardness and withstood 80 inch pounds direct impact and showed a slight failure at 80 inch pounds reverse impact. The panel was highly resistant to acetone rubbing.

Calcium zinc phosphate treated steel panels were electrocoated under similar conditions and showed a 60° gloss reading of 82-84.

Salt spray panels similarly electrocoated passed an excess of 312 hours salt spray.

EXAMPLE II

In a manner similar to Example I, the following was prepared from a monomer feed of the following composition:

| Monomer | Parts by Weight |
| --- | --- |
| Ethyl acrylate | 2100 |
| Methyl methacrylate | 1800 |
| Glycidyl methacrylate | 900 |
| 2-hydroxyethyl acrylate | 900 |
| Styrene | 300 |

The above monomer mixture also contained 180 parts of tertiary dodecyl mercaptan and 90 parts of Vazo [azo-bis(isobutyronitrile)].

After the polymerization was complete, there was added to the resultant polymer 6 parts of 2,6-ditertiarybutyl paracresol.

To the above polymer at 93° C. there was added a mixture of 370 parts of thiodiethanol, 318 parts of 85 percent lactic acid and 300 parts of deionized water. Thix mixture was added over a 2-minute period. The temperature of the mixture dropped to 84° C. and the mixture was heated, with stirring, to 98° C. for 80 minutes, at which time an additional 360 parts of water were added.

The analysis of the resultant polymer showed 72.5 percent solids, a hydroxyl value of 159 and an epoxy value of 5087, with a viscosity of 46,800 centipoises. This polymer is hereinafter identified as Polymer B.

A pigment paste was prepared by admixing 212.2 parts of Polymer B, 196 parts of titanium dioxide, 4 parts of pigmentary silica and 192 parts of butyl Cellosolve. The above mixture was ground in a Cowles mill to a 7+ grind.

An electrodepositable composition as prepared by admixing 181.5 parts of Resin B, 130 parts of the above pigment paste and 32.4 parts of a ketoxime blocked tri-functional aliphatic isocyanate (Desmodur N) (the 32.4 parts of ketoxime comprising 25.9 parts solids dissolved in methyl-n-butyl ketone. There was then added 2156 parts of deionized water to provide an approximately 10 percent solids electrodeposition bath having a pH of 7.7 and a conductivity of 290 mmhos. Zinc phosphate treated steel panels were electrodeposited at 200 volts for 90 seconds at 77° F. and baked at 350° F. for 20 minutes. The resultant film build was one mil. The film had a 2H pencil hardness and withstood 160 inch pounds direct and reverse impact and had a 60° gloss of 72.

In a manner similar to the above examples, various other monomers as described hereinabove can be utilized or prepared and these interpolymers can be reacted with other sulfide/acid combinations as disclosed hereinabove to provide either epoxy containing or epoxy-free sulfonium salt group solubilized resins, which can be combined with various capped isocyanates as described above and electrodeposited or coated in a conventional manner to provide highly useful coating compositions.

According to the provisions of the Patent Statutes, there are described above the invention and what are now considered to be its best embodiments. However, within the scope of the appended claims, it is to be understood that the invention can be practiced otherwise than as specifically described.

We claim:
1. An aqueous based resinous dispersion suitable for use as a coating composition comprising as the resinous phase:
   A. a quaternary sulfonium salt group solubilized synthetic organic resin coating free hydroxyl groups, said organic resin produced by reacting:
      1. an epoxy-containing organic material having a 1,2-epoxy equivalency of greater than 1, and
      2. a sulfide-acid mixture, said sulfide-acid mixture being used in an amount to provide sufficient quaternary sulfonium groups to solubilize said resin; said sulfide being selected from the group consisting of aliphatic, mixed aliphatic-aromatic, aralkyl and cyclic sulfides; and
   B. a capped, organic polyisocyanate stable at ordinary room temperature in the presence of said resin (A)

and reactive with said resin (A) at elevated temperatures.

2. The aqueous based resinous dispersion as in claim 1 wherein (A) and (B) are present in proportions to provide about 0.5 to about 2.0 latent urethane groups per isocyanate reactive group.

3. The aqueous based resinous dispersion as in claim 1 wherein the isocyanate reactive groups comprise hydroxyl groups.

4. The aqueous based resinous dispersion as in claim 3 wherein (A) and (B) are present in proportions to provide about 0.5 to about 2.0 latent urethane groups per hydroxyl group.

5. The aqueous based resinous dispersion as in claim 1 wherein the resin (A) has a backbone derived from the interpolymerization of an olefinically unsaturated glycidyl compound and at least one other copolymerizable olefinically unsaturated monomer.

6. The aqueous based resinous dispersion as in claim 5 wherein the resin (A) has a backbone derived from the interpolymerization of an olefinically unsaturated glycidyl compound, a hydroxyl alkyl ester of acrylic or methacrylic acid, and at least one other copolymerizable olefinically unsaturated monomer.

7. The aqueous based resinous dispersion as in claim 6 wherein (A) and (B) are present in proportions to provide about 0.5 to about 2.0 latent urethane groups per hydroxyl group.

8. The aqueous based resinous dispersion as in claim 1 wherein the resin (A) contains free epoxy groups.

9. The aqueous based resinous dispersion as in claim 8 wherein (A) and (B) are present in proportions to provide about 0.5 to about 2.0 latent urethane groups per isocyanate reactive group.

10. The aqueous based resinous dispersion as in claim 8 wherein the isocyanate reactive groups comprise hydroxyl groups.

11. The aqueous based resinous dispersion as in claim 10 wherein (A) and (B) are present in proportions to provide about 0.5 to about 2.0 latent urethane groups per hydroxyl group.

12. The aqueous based resinous dispersion as in claim 8 wherein the resin (A) has a backbone derived from the interpolymerization of an olefinically unsaturated glycidyl compound and at least one other copolymerizable olefinically unsaturated monomer.

13. The aqueous based resinous dispersion 12 as in claim 12 wherein the resin (A) has a backbone derived from the interpolymerization of an olefinically unsaturated glycidyl compound, a hydroxyl alkyl ester of acrylic or methacrylic acid, and at least one other copolymerizable olefinically unsaturated monomer.

14. The aqueous based resinous dispersion as in claim 13 wherein (A) and (B) ae present in proportions to provide about 0.5 to about 2.0 latent urethane groups per hydroxyl group.

* * * * *

UNITED STATES PATENT AND TRADEMARK OFFICE
CERTIFICATE OF CORRECTION

PATENT NO. : 4,038,232
DATED : July 26, 1977
INVENTOR(S) : Joseph F. Bosso and Marco Wismer It is certified that error appears in the above-identified patent and that said Letters Patent are hereby corrected as shown below:

Column 2, line 68, "quality" should be --quantity--.

Column 3, line 45, "group" should be --groups--.

Column 6, line 8, insert --1,2-dibromoethylene, 1,2-difluoroethylene,-- before "1,2-diiodoethylene".

Column 7, line 47, insert --about-- after "least".

Column 8, line 16, "born" should be --boron--.

Column 8, line 31, insert --and-- after "solvents".

Column 9, line 53, "alwarys" should be --always--.

Column 9, line 57, "betwen" should be --between--.

Column 12, line 7, "Thix" should be --This--.

Column 12, line 21, "as" should be --was--.

UNITED STATES PATENT AND TRADEMARK OFFICE
CERTIFICATE OF CORRECTION

PATENT NO. : 4,038,232
DATED : July 26, 1977
INVENTOR(S) : Joseph F. Bosso and Marco Wismer It is certified that error appears in the above-identified patent and that said Letters Patent are hereby corrected as shown below:

Column 12, line 57, "coating" should be --containing--.

Column 14, line 19, delete "12" after "dispersion".

Column 14, line 26, "ae" should be --are--.

Signed and Sealed this

First Day of November 1977

[SEAL]

Attest:

RUTH C. MASON
*Attesting Officer*

LUTRELLE F. PARKER
*Acting Commissioner of Patents and Trademarks*